United States Patent [19]
Fedotowsky et al.

[11] 3,728,009
[45] Apr. 17, 1973

[54] PHASE FILTER COMBINATION WITH LENS OPTICS

[75] Inventors: André Fedotowsky, Cap Rouge, Canada; Kurt Lehovec, Williamstown, Mass.

[73] Assignee: Inventors & Investors, Inc., Williamstown, Mass.

[22] Filed: Nov. 2, 1971

[21] Appl. No.: 194,990

[52] U.S. Cl. ............................350/162 ZP, 350/205
[51] Int. Cl. .............................................G02b 27/00
[58] Field of Search ..................350/162 R, 162 ZP, 350/205

[56] References Cited

UNITED STATES PATENTS

| | | |
|---|---|---|
| 3,263,079 | 7/1966 | Mertz et al. ..............350/162 ZP UX |
| 3,045,530 | 7/1962 | Tsujiuchi..................350/162 ZP UX |
| 1,561,149 | 11/1925 | Gage........................350/162 ZP UX |
| 3,547,546 | 12/1970 | Schier..............................350/162 ZP |
| 3,213,277 | 10/1965 | Hoppe.....................350/162 ZP UX |

Primary Examiner—John K. Corbin
Attorney—Kurt Lehovec

[57] ABSTRACT

A zonal phase filter is combined with a lens optics to produce a circular image of a point light source. Integration of the phase filter with zone plate optics is described.

11 Claims, 6 Drawing Figures

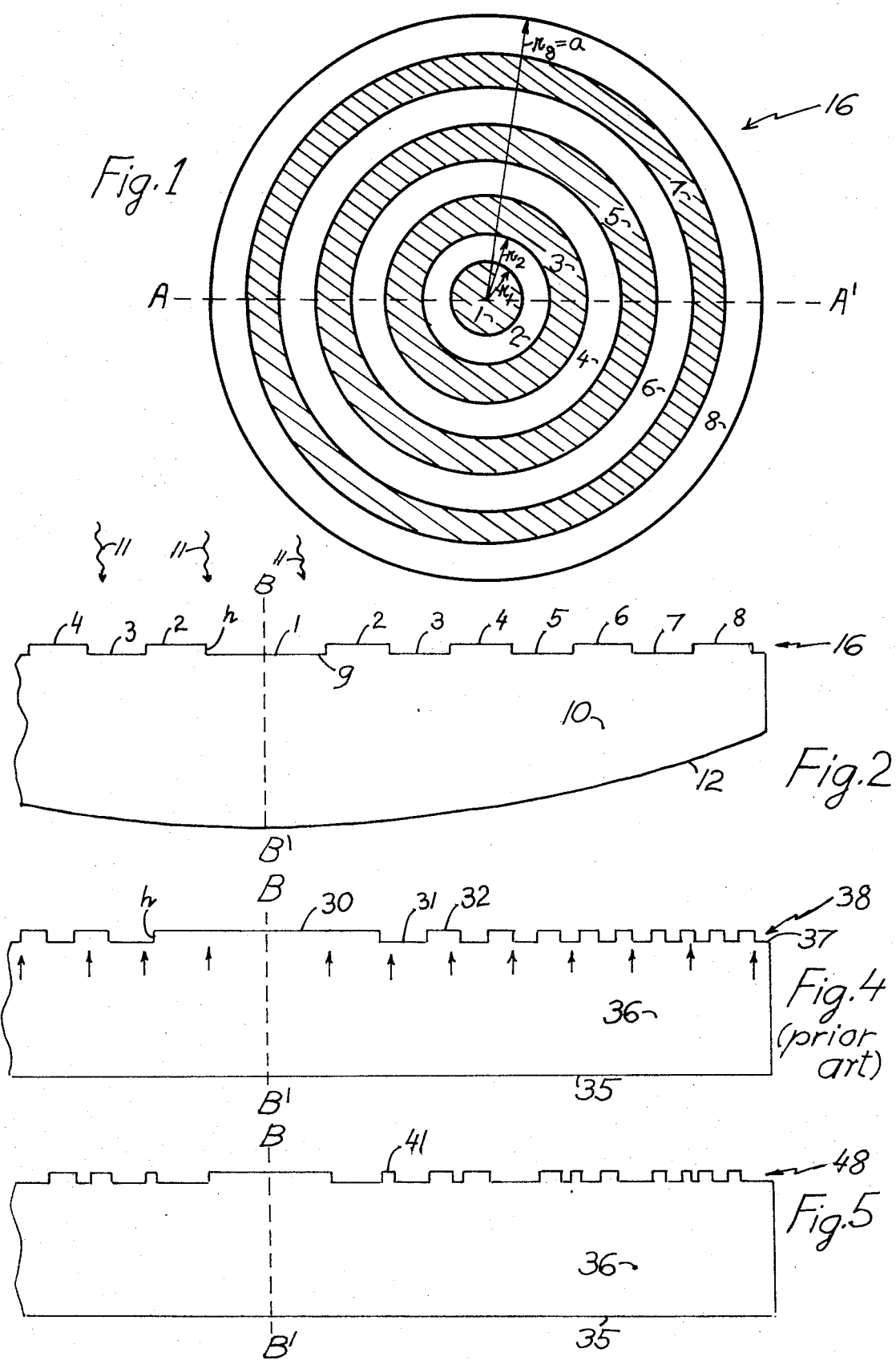

PHASE FILTER COMBINATION WITH LENS OPTICS

BACKGROUND OF THE INVENTION

The invention herein described was made in the course of or under a contract with the United States Air Force.

This invention deals with an improved optical image-forming structure. In particular, this invention deals with a structure which focusses an incident plan a parallel beam in a line-shaped configuration.

In a co-pending application, Ser. No. 194,999, filed concurrently with this application on Nov. 2, 1971 and titled "Zone Plate Optics Monolithically Integrated with Photoelectric Elements," the utilization of radiation sensors of circular shape is described. This application teaches the optics to produce a circular radiation image. The principles here described can be used also with optical arrangements of symmetry other than circular.

For instance, a parallel incident beam can be imaged into two parallel lines.

Accordingly, it is the object of this invention to describe optical systems which focus a point source into a contour.

It is another object to describe optical systems of the above-mentioned property which maximize the radiation intensity in the image configuration by suppressing most of the radiation intensity elsewhere, in particular, along the optical axis.

BRIEF DESCRIPTION OF THE INVENTION

An annular radiation image of a point source is obtained by combining a circular phase grating with a lens. Diffraction rings of the phase grating are imaged into the image plane of the lens.

The phase grating can be integrated with a zone plate lens by modifying appropriately the location of transparent zones and of zones having $\lambda/2$-phase shift against these zones.

For imaging plane incident radiation into two lines, a linear phase grating in combination with a cylindrical lens or a linear zone plate is used.

BRIEF DESCRIPTION OF DRAWINGS

FIG. 1 shows a circular phase grating in top view.

FIG. 2 shows a cross section along the optical axis through the circular phase grating of FIG. 1 combined with a lens.

FIG. 4 shows a cross section through a prior art circular zone plate optics.

FIG. 5 shows the integration of zone plate optics of FIG. 4 with phase filter of FIGS. 1 or 2.

SPECIAL EMBODIMENTS

Figure 3:
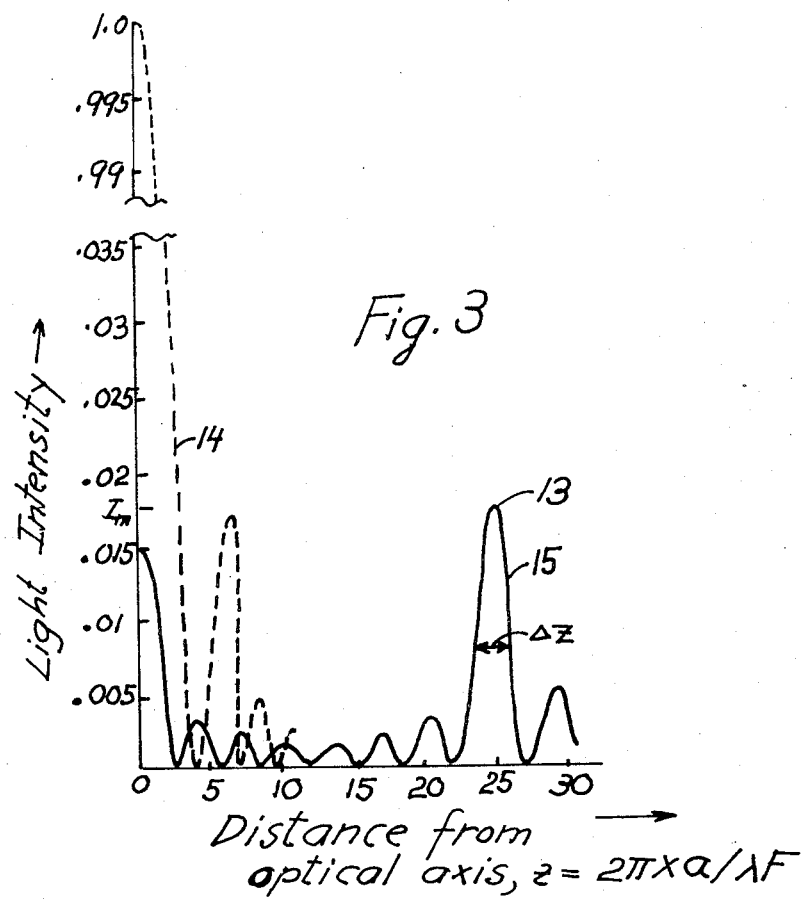
FIG. 3 shows the intensity distribution in the focal plane of the structure of FIG. 2.

Referring to FIG. 1, there is shown a top view of a circular phase filter 16 having annulus-shaped concentric sections 1 to 8. The radii of the boundaries of these sections are designated by $r_1$, $r_2$, etc. to $r_8$. The outer radius $r_8 = a$ is the aperture radius. All sections are transparent, but the sections 2, 4, 6, 8 introduce a phase shift of $\pi$ (i.e., $\lambda/2$) against the sections 1, 3, 5 and 7. This phase shift can be produced by elevations 2, 4, 6, 8 of planar surface 9 on substrate 10 as shown in vertical cross section of FIG. 2 along line A—A' of FIG. 1. The height of elevation is $h = \lambda_v/2(n-1)$, where $\lambda_v$ is the vacuum wavelength of incident light 11 and $n$ is the refractive index of substrate material 10.

The lower surface 12 of substrate 10 has been given a lens shape. Focal length of this lens will be designated by F.

According to this invention, the image of the normally incident plane parallel light wave 11 is concentrated in a circle in the focal plane of radius $x_o$, if the radii $r_l(l = 1, \ldots 8)$ are chosen to coincide, or nearly coincide, with the positions of extrema of the function $r_l J_1 (r_l 2\pi x_o/\lambda f)$, where $x_o$ is the spacing of the circular image from the optical axis B — B', and $J_1$ is a Bessel function. These extrema are located at the zero's of the Bessel function $J_0 (r_l 2\pi x_o/\lambda F)$.

Since these extrema are located approximately at $n\pi - \pi/4$ ($n = 1, 2, 3$, etc.), i.e., they are equally spaced by $\pi$, a good approximation is $$r_l = la/2M$$

with $r_{2M} = a = (2M - \frac{1}{4})\pi\lambda F/2\pi x_o$, i.e., $$x_o = (2M - \frac{1}{4})\lambda F/2a$$

Noticeable error of the above approximation for the location of extremum occurs only at the first maximum, but this becomes insignificant for large values $2M$ of the number of sections. Here M is the number of full zones in the filter, each full zone comprising two sections of phase difference $\pi$ (or $\lambda/2$). The filter shown in FIGS. 1 and 2 has $M = 4$.

FIG. 3 shows the intensity distribution 15 in the focal plane of the lens-phase filter combination of FIG. 2. Dotted line 14 refers to the intensity distribution of the lens without filter normalized to unity at the focal point. Note the suppression of much of light intensity at the optical axis by the filter. This suppression results from destructive interference of light arriving at the focal point from filter sections of phase shift $\pi$ against each other. The remaining light intensity at the optical axis is roughly proportional to the square of difference in combined area of sections 1, 3, 5, 7 vs. 2, 4, 6, 8. This difference in relation to total area $a^2\pi$ decreases as $(2M)^{-1}$ with number of sections. Therefore, the suppression of focal point intensity improves with number $2M$ of filter sections.

While the peak light intensity 13 of the ring-shaped image may seem low at first glance, it must be considered that the light intensity in the main lobe of the ring-shaped image is $I_M 2\pi x_o \Delta x$, which is much larger than in the lobe of 15 near the axis, because of $x_o$. In the example shown, the lobe peaking at 13 contains 54 percent of the total light intensity.

It is noted in passing that a zonal amplitude filter comprising alternate sections of transmissions 1 and 0, would not suppress effectively the light intensity in the optical axis. High intensity integrated over area in the disk at the optical axis would be about equal to that in the ring-shaped lobe at $x_o$. In addition, one-half of incident light intensity would be lost by absorption in the opaque filter sections.

The phase-shift zone filter 16 is particularly well suited to integration with zone plate lenses. FIG. 4 shows a cross section through an ordinary prior-art circular zone plate lens 38, drawn to the same scale as FIG. 2, as far as radial proportions and elevations are concerned. In both figures, vertical elevations are exaggerated with regard to horizontal radii for clearer perception of detail. Steps of height $h$ corresponding to ½ wavelength phase shift occur between adjoining half-zones 30, 31, 32, etc. Lower surface 35 of substrate body 36 is parallel to upper surface 37 which carries zone plate lens 38.

FIG. 5 shows the combination of phase-shift filter 16 of FIG. 1 or 2 and zone plate lens 38 of FIG. 4 into an integrated unit 48.

FIGS. 2, 4 and 5 have been drawn to the same scale and aligned along the optical axis B — B' in order to facilitate recognition of the principle of generating 48 from 16 and 38. Moreover, radii of filter sections have been denoted in FIG. 4 by vertical arrows. Within filter sections 1, 3, 5 and 7 zone plate structure of 38 is maintained in 48. However, within filter sections 2, 4, 6 and 8 zone plate structure of 48 is the opposite of that in 38, i.e., a valley in 38 has become an elevation in 48, and an elevation in 38 has become a valley in 48.

The structure of FIG. 4 gives the same intensity distribution in the focal plane as that of FIG. 2, except that intensity in case of FIG. 4 is reduced by a factor $4/\pi^2 \cong 40\%$.

Figure 6:
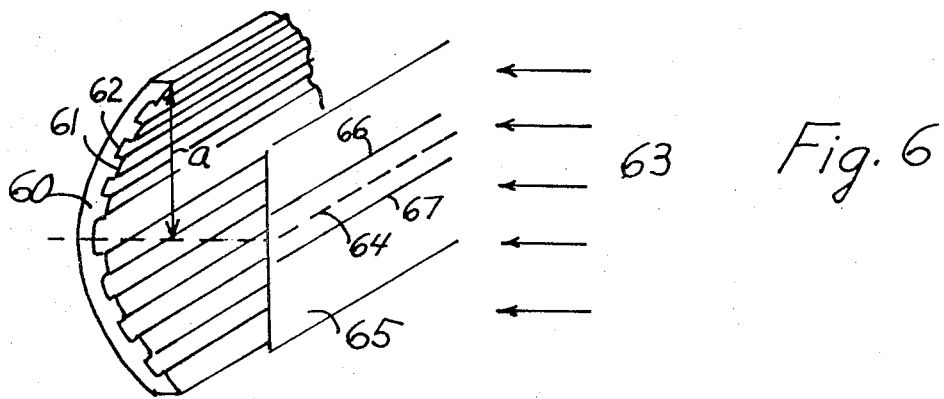
FIG. 6 shows a linear phase shift filter integrated with a parabolic mirror optics of cylindrical design.

Referring now to FIG. 6, there is shown a cylindrical parabolic mirror 60 having a linear λ/2-phase grating 61 on its mirror surface 62. A parallel incident radiation 63 which would be focused without phase grating into dotted line 64 in focal plane 65, is actually focused in the two lines 66, 67 spaced from 64. The intensity distribution in the focal plane of a parabolic lens is of the type $\sin z/z$ which replaces the function $J_1(z)/z$ for a circular lens. The extrema of the function $\sin z$ are equally spaced along the z-axis. The phase-shift filter is selected of sections of alternate phases differing by λ/2 or $\pi$, and of spacing from the center corresponding to the extrema of $\sin z/z$, i.e., approximately $$d_l \cong al/2M$$

$l = 1, 2, \ldots 2M$, where $a$ is one-half of the aperture of the parabolic mirror.

Since there are many variations of the embodiments which fall under this invention, this invention should not be limited by the special embodiments discussed as illustrations, but should encompass all optical structures defined by the following claims.

We claim:

1. An optical system comprising conventional optical means for imaging monochromatic radiation into a first image, in combination with a phase shift filter comprising a sequence of zones, each zone consisting of one section of a first kind and a laterally displaced section of a second kind, a phase difference of $\pi$, i.e., half a wavelength, between rays passing through adjoining said zone sections of the first and second kind; the widths of said sections dimensioned to suppress the intensity of said radiation from said first image, and to shift that suppressed intensity into a second image, said second image laterally spaced from said first image, said first image located centrally to said second image.

2. The optical system of claim 1 whereby said phase shift filter is integrated with said conventional optical means for imaging.

3. The optical system of claim 2 whereby said conventional optical means for imaging is a lens and said phase filter is located on one of the surfaces of said lens.

4. The optical system of claim 2 whereby said conventional optical means for imaging and said phase shift filter have circular symmetry and are concentrically aligned, said first image being an image point, said second image being a ring surrounding said image point.

5. The optical system of claim 4 whereby said sections of said phase shift filter are bounded by radii $r_l$ ($l = 1, 2, \ldots$), selected to coincide substantially with the location of zeros of the Bessel function $J_o(r_1 \pi x_o/\lambda F)$ where $x_o$ is the distance from the optical axis of said ring-shaped image, λ is the wavelength of the radiation and F is the focal length of said conventional optical means.

6. The optical system of claim 4 whereby said sections of said phase shift filter are bounded by radii $r_l = la/2M$, where $l = 1, 2, \ldots 2M$, whereby $2M$ is the number of regions of said phase shift filter and $a$ is its aperture radius.

7. The optical system of claim 1 whereby said conventional optical means for imaging is a zone plate lens.

8. The optical system of claim 7 whereby said zone plate lens comprises a first set of sections and a second set of sections, the sections of said first set having phase shifts $\pi$, i.e., of λ/2 against the sections of said second set.

9. The optical system of claim 8, said phase filter and zone plate lens forming an integral unit, said unit consisting of at least portions of zone plate lens sections of said first set being replaced by corresponding portions of said second set, and at least portions of sections of said second set by corresponding portions of said first set within the sections of said first kind of said phase shift filter.

10. The optical system of claim 1, whereby said conventional optical means is a cylindrical optical means, said first image is a line, said sections of said phase shift filter are bounded by straight lines extending in direction parallel to the axis of said cylindrical optical means, said second image consisting of two lines parallel to said first image and located one at each side of said first image.

11. The optical system of claim 10 wherein said cylindrical optical means is a parabolic mirror.

* * * * *